United States Patent
Gegner

(10) Patent No.: US 7,144,545 B2
(45) Date of Patent: Dec. 5, 2006

(54) PROCESS FOR THE PRODUCTION OF CERAMIC BEARING COMPONENTS

(75) Inventor: Jürgen Gegner, Fürth (DE)

(73) Assignee: AB SKF, Gothenburg (SE)

( * ) Notice: Subject to any disclaimer, the term of this patent is extended or adjusted under 35 U.S.C. 154(b) by 416 days.

(21) Appl. No.: 10/290,320

(22) Filed: Nov. 8, 2002

(65) Prior Publication Data

US 2003/0114294 A1    Jun. 19, 2003

(30) Foreign Application Priority Data

Nov. 9, 2001    (DE) ............................... 101 54 739

(51) Int. Cl.
*C04B 35/571*    (2006.01)

(52) U.S. Cl. .................... 264/624; 264/29.6; 264/29.7; 264/678

(58) Field of Classification Search ........ 264/624–626, 264/29.1, 29.6, 29.7, 678
See application file for complete search history.

(56) References Cited

U.S. PATENT DOCUMENTS

| | | | |
|---|---|---|---|
| 4,097,294 A * | 6/1978 | Rice et al. ................ 501/87 |
| 4,172,108 A * | 10/1979 | Maeda .................... 264/626 |
| 4,335,217 A * | 6/1982 | Hatta et al. ............... 501/92 |
| 4,395,460 A * | 7/1983 | Gaul ....................... 428/408 |
| 4,687,657 A * | 8/1987 | Clark et al. .............. 423/412 |
| 5,272,239 A * | 12/1993 | Jensen ...................... 528/9 |
| 5,348,917 A * | 9/1994 | Keller et al. ............... 501/92 |
| 5,438,025 A * | 8/1995 | Leung et al. ............ 501/96.5 |
| 5,698,485 A * | 12/1997 | Bruck et al. ............. 264/624 |
| 5,877,104 A * | 3/1999 | Bryson et al. .............. 501/88 |
| 6,013,226 A * | 1/2000 | Steel et al. ............... 419/49 |
| 6,709,999 B1 * | 3/2004 | Greil et al. ................ 501/88 |
| 2002/0035026 A1 | 3/2002 | Greil et al. |

FOREIGN PATENT DOCUMENTS

| | | |
|---|---|---|
| DE | 3500962 A1 * | 7/1985 |
| DE | 100 30 011 A1 | 1/2002 |
| EP | 400862 A1 * | 12/1990 |
| EP | 0 366 443 B1 | 8/1993 |
| EP | 0 412 428 B1 | 11/1994 |

* cited by examiner

Primary Examiner—Carlos Lopez
(74) Attorney, Agent, or Firm—Buchanan Ingersoll & Rooney PC

(57) ABSTRACT

The invention relates to a process for the production of ceramic bearing components in which a mixture of a metallo-organic compound and a chemically reactive filling substance is subjected to a pyrolysis reaction and the resulting product.

25 Claims, 1 Drawing Sheet

PROCESS FOR THE PRODUCTION OF CERAMIC BEARING COMPONENTS

Figure 1:
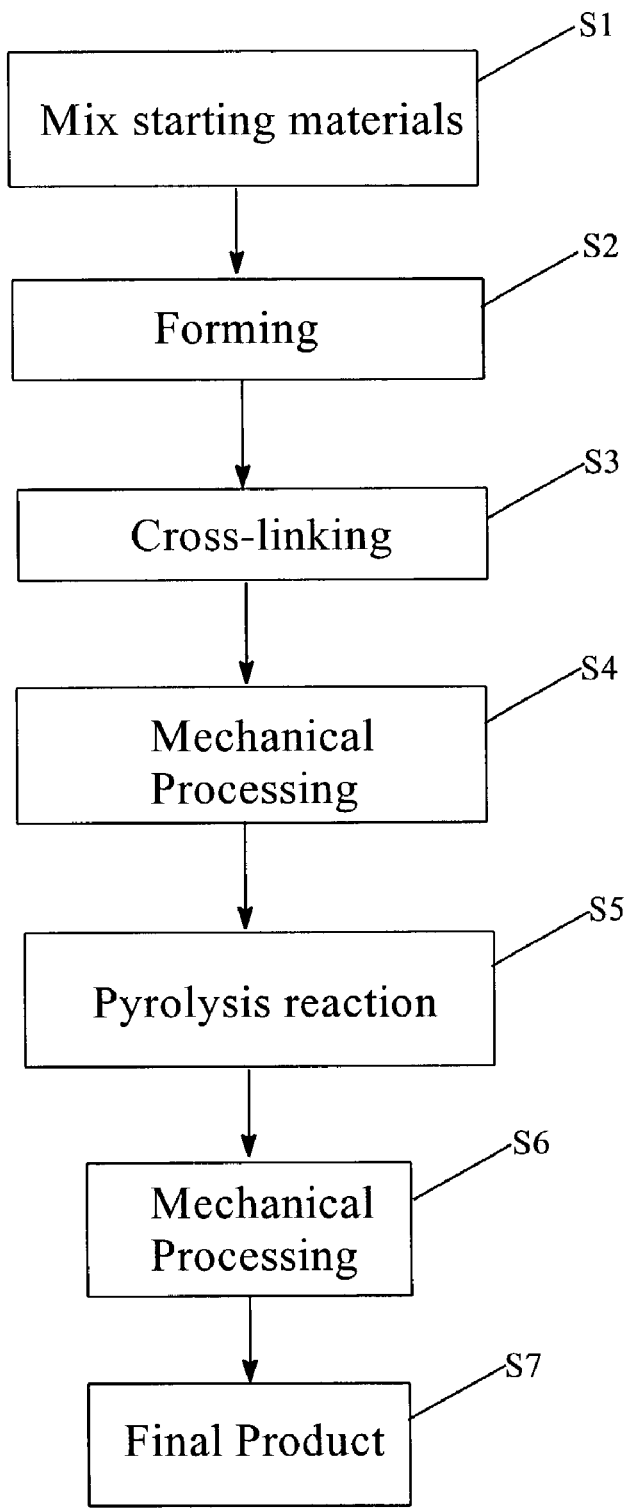

This application is based on and claims priority under 35 U.S.C. § 119 with respect to German Application No. 101 54 739.0 filed on Nov. 9, 2001, the entire content of which is incorporated herein by reference.

FIELD OF THE INVENTION

The invention relates to a process for the production of ceramic bearing components.

BACKGROUND OF THE INVENTION

In slide bearing applications as well as in roller bearing applications, it is already known to use ceramic bearing components. Ceramic bearing components can, for example, be rolling elements, bearing rings or cages of a roller bearing, bearing seals or a slide bearing.

EP 0 366 433 B1 discloses ceramic bearing modules and a process for the production of bearing modules of this type. The bearing modules are formed of a ceramic material which contains metallic components including several of the elements iron, nickel, chromium, and tungsten in an amount of 3500 ppm or less. In the disclosed process for the production of a ceramic roller bearing module, the ceramic raw material powder is converted into a paste form. The paste is granulated, formed into the desired shape, and sintered. During the process, metallic components are reduced to a residual value of 3500 ppm or less.

Although ceramic bearing components have already proven themselves effective because they have a comparatively long life-time even under extreme conditions such as, for example, high temperatures, high rotational speed or loss of lubricant, the use of ceramic bearing components has previously been restricted to the field of special applications. This is due to the fact that the production costs of the bearing components with the application of known production processes clearly exceed the production costs of comparable bearing components of steel.

SUMMARY OF THE INVENTION

The objective of the invention is to specify a process for the production of ceramic bearing components, said process being cost-effective and nonetheless fulfilling the high quality requirements existing in the field of bearing technology.

This objective is fulfilled by a process with the processing steps for the production of ceramic bearing components comprising mixing a metallo-organic preceramic precursor compound and a chemically reactive filling substance and subjecting the mixture to a pyrolysis reaction.

In the process according to the invention, a mixture of substances including a metallo-organic compound as preceramic precursor and a chemically reactive filling substance, is subjected to a pyrolysis reaction. In the pyrolysis reaction, a thermal conversion of the polymer into a ceramic material takes place.

The procedure has the advantage that the production process, compared with sintering and hot-pressing processes used in the conventional manner of production of ceramic bearing components, runs significantly faster and requires a significantly lower energy input. Furthermore, both the starting materials used and the near-net-shaping properties of the filler, loaded polymer and especially of the sintered green compact are comparatively favorable from the standpoint of cost. A further advantage consists of the fact that, with suitable processing conditions, hardly any shrinkage or porosity occurs.

The mixture of substances can contain a silicon-organic compound as preceramic precursor, where polysiloxanes, i. a., due to their preprocessing, which is not affected by a sensitivity to moisture, being able to be carried out in air, and their hydrolysis stability, are particularly well suited. Also, thanks to their corresponding availability, they can be obtained comparatively cost-effectively. While in principle any polysiloxane could be used, only the silicone resins can be cured, which is important for the machining of the green compact and they are thus preferred. Most preferred are polysilsesquioxanes, such as polymethylsiloxane $(CH_3SiO_{1.5})$.

As a chemically reactive filling substance, a metal-silicon intermetallic material, in particular an iron-silicon intermetallic material, can be used. These materials can react with decomposition products of the precursor (e.g. carbon) and also, due to transient open porosity, with gas from an reactive atmosphere (e.g. nitrogen). The use of iron-silicon intermetallic material has once again the advantage that this material is readily available and therefore very cost-effective. Here, for example, industrial remnants (for example, from the steel industry) suitable for use are conceivable, in given cases after appropriate preparation. The chemically reactive filling substance can be processed in the form of a powder with a grain size on the order of magnitude of from about 1 to about 100, preferably from about 1 to 50, μm.

Moreover, the mixture of substances can contain at least one additional chemically reactive filling substance and/or at least one inert filling substance. Thereby, the shrinkage and/or the mechanical properties of the resulting product can be optimized. Suitable reactive fillers include silicides of transition metals like $CrSi_2$ or $MoSi_2$; silicon; boron; metals like Al, etc. Inert fillers include SiC, $Si_3N_4$, $Al_2O_3$, MgO, and BaO.

The pyrolysis reaction can be carried out in a chemically reactive gas atmosphere, where, in particular, a nitrogen atmosphere is suitable. Through the gas atmosphere, additional reaction partners are made available, in particular for the production of a ceramic material based on a nitride, especially silicon nitride. With the aim of a reaction running as efficiently as possible, it is advantageous if the pyrolysis reaction is carried out under excess pressure of from about 1 to 50, preferably from about 1 to 5, MPa nitrogen.

The pyrolysis reaction can be done in a multi-stage, temperature-controlled process, in particular in order to exploit therein temperature windows of open porosity with regard to the reactivity with reactive atmosphere gas. The porosity changes from open to closed porosity with increasing temperature (intermediate steps are possible: e.g., open, closed, open, closed). It is important to use the larger transient open porosity as nitrogen from the gas atmosphere can then react with filler particles. At higher temperatures and with increasing filler reaction, the amount of porosity decreases and open pores will be closed. Intermediate steps can be chosen approximately in the range of 400° C. to 1000° C. with holding times from about 30 minutes to 10 hours, preferably from about 1 to 5 hours. The final temperature of the pyrolysis, which typically is maintained over a time of from about 1 to 200, preferably about 5 to about 50, hours, lies between 1000° C. and 1700° C., preferably between 1200° C. and 1500° C. This has the advantage that a qualitatively particularly high-value, for example, practically residual polymer-free, ceramic material is produced. The resulting product is in the form of a microscopically structured ceramic material (which in given cases may contain a slight percentage of unbonded free metal, depending on the processing with a maximum free metal content of 10 volume percentage) for example, in the reaction of a suitable silicon-organic precursor with a metal-silicon intermetallic material as a chemically reactive filling substance and a nitrogen atmosphere to form a ceramic of predominantly silicon nitride and silicon carbide. Depending on the reaction partner and processing conditions, one skilled in the art can produce an oxygen-containing or oxygen-free ceramic material or a slight percentage of residual polymer can be retained in the composite material.

Before the pyrolysis reaction, a first forming of the mixture of substances, said forming roughly modeling the bearing component and being accomplished by, for example, pressing or molding, can be carried out along with a hardening of the metallo-organic compound contained in the mixture of substances. This hardening or stabilization for the green component can be done with or without weight loss and, in particular, under pressure of from about 1 to 50 MPa, typically about 20 MPa, and by heat transfer at a temperature of about 100° C. to 300° C. Alternatively or in addition thereto, the hardening can also be completed by the action of radiation as well as promoted by additives. In the framework of the hardening, a semi-finished product of stable form can be produced from the mixture of substances, from which semi-finished product the bearing components can be fabricated in their near-net-shape dimensions by mechanical processing before carrying out the reaction pyrolysis. This has the advantage that the mechanical processing required for the production of the bearing components takes place for the most part with conventional processes customary in industry, e. g., cutting with low tool wear on the relatively soft green part and not on the hard, brittle ceramic product. This simplifies the processing significantly so that an efficient and cost-effective production is possible.

The components of the mixture of substances can be coordinated with one another in a manner apparent to the skilled artisan so that the bearing components do not have any noteworthy volumetric shrinkage when the reaction pyrolysis is carried out or they experience a controlled, small change in volume oriented toward the concluding final processing. This has the advantage that the green component can be processed nearly to its final dimensions. After carrying out the pyrolysis reaction, a mechanical final processing of the bearing components can then be done. In so doing however, still only a relatively small amount of material removal is required.

It is thus possible with the process according to the invention to produce bearing components for standard applications as well as for special applications with material properties then also adapted to the corresponding special requirements and, in given cases, selectively modified, for example, in certain mechanical parameters.

BRIEF DESCRIPTION OF THE DRAWING FIGURE

The invention is explained in more detail in the following with the aid of the embodiment example represented in the FIGURE.

The foregoing and additional features and characteristics of the present invention will become more apparent from the following detailed description considered with reference to the accompanying drawing FIGURE in which like reference numerals designate like elements.

The single FIGURE shows a flow chart to illustrate the course of the process according to the invention.

DETAILED DESCRIPTION OF THE INVENTION

For the production of bearing components according to the process according to the invention, a mixture of substances is produced in a first step S1, said mixture of substances containing a metallo-organic compound and a chemically reactive filling substance. As the metallo-organic compound, silicon-organic compounds are particularly suitable. In the preferred embodiment example described herein, a polysilsesquioxane is used. For the chemically reactive filling substance, metal-silicon intermetallic materials in particular can be used. In the preferred embodiment example, an iron-silicon intermetallic material with a percentage by volume of the total mixture typically in the range of from about 10 to 60, preferably about 20 to 50, typically about 40, is used. Suitable metal (iron) silicon intermetallic materials are metal silicide(s) and iron silicide. Additionally, we preferentially use metal disilicide(s), i.e., $MSi_2$ (e.g., $CrSi_2$, $MoSi_2$), and iron disilicide ($FeSi_2$). Metal-silicon intermetallic materials can be processed in the framework of the process according to the invention in the form of a powder with suitably small grain size in the μm range, for example about 1 to 10 μm. A small grain size is essential for the monitoring and minimization of the shrinkage occurring in the pyrolytic polymer-ceramic conversion and associated with the increase in density. Polysilsesquioxane occurs, according to its composition, in the form of a liquid, a thick liquid, or even a paste or a solid. The mixing of the mixture of substances can be done, say, by kneading, stirring, intensive mixing, or the like.

In step S2 following step S1, the mixture of substances is filled into a mold which predefines the contours of the green component. If, for example, rolling elements in the form of a roller are to be produced, then a mold is suitable with which a round rod can be formed. The mold can however also be made so that the mixture of substances is formed as a tube from which rings for rolling bearings or for slide bearings are produced. In principle, all the current forms of bearing components such as, for example, rolling elements or bearing rings, cages or seals, or of semi-finished products for the production of bearing components, can be realized.

Step S3 follows step S2. In step S3, the mixture of substances is cross-linked in the mold under the action of pressure at a temperature of ca. 100° C. to 300° C. to form a green component. Alternatively, the cross-linking can in principle also be completed by an irradiation at room temperature as well as with the aid of additives. Irradiation can also be used in addition to thermally induced cross-linking. In this case the irradiation takes place above room temperature.

The green component is stable in form but still comparatively soft so that it can be easily processed mechanically. The mechanical processing takes place in a step S4, which follows step S3. One or more rolling element components can be produced from the green component, e. g., by a metal-cutting process, where in regard to the desired final dimensions only a small allowance for a concluding fine processing is required. Thus, for the production of cylinder rollers from a round rod, individual sections can be cut off and brought to the desired near-net-shape dimensions of the cylinder roller by turning and/or grinding. The fine processing, with which the final dimensions and the desired surface topography can be produced, is done at a later point in time of the process.

When the rough processing of the green component is concluded, the green component is subjected, in a step S5, to a pyrolysis reaction through which the cross-linked mixture of substances of the green component is converted into a ceramic. The pyrolysis reaction is carried out in a nitrogen atmosphere where a nitrogen excess pressure of up to 5 MPa is chosen. The temperature is typically 1500° C. over, for example, 6 hours during the pyrolysis reaction setting in as of about 400° C. after an intermediate step at about 500° C. with about a 1-hour holding time. In principle, even lower temperatures of, for example, 1000° C. can be chosen. Then however, it is to be taken into account that still a certain percentage, increasing with lowering temperature, of residual polymer is present in the ceramic material produced in such a manner. For the production of a qualitatively high-value ceramic, as a rule temperatures between 1200° C. and 1500° C. are required. However, even higher temperatures up to about 1700° C. are possible so that on the whole a temperature range of about 1000° C. to 1700° C. comes into consideration. Under the reaction conditions described, the cross-linked green component is converted into a ceramic material based on silicon nitride and the oxygen contained substantially expelled. The ceramic product thus obtained has a microscopic structure and only slight porosity, typically on the order of magnitude of a few percent, which moreover is closed and distributed very finely. Along with the principal component silicon nitride, the ceramic composite material produced contains predominantly carbides as well as a small amount of residual oxygen, which in particular is oxidically bound to metallic components. The carbides predominantly stem from the reactive filler particles and are thus the corresponding carbon compounds, e.g., $Cr_3C_2$, $Fe_3C$. Additionally, SiC can be present within the final ceramic material due to both pyrolysis reaction and inert filler additives. As discussed above, a small amount (less than about 10% by volume) of residual unbonded free metals can also be present.

In the framework of the reaction pyrolysis, the components of the mixture of substances or the decomposition fragments of the polymer matrix react with one another as well as with the ambient nitrogen atmosphere. Thereby it is possible to compensate for the shrinkage associated with the increase in density and the withdrawal of hydrogen (hydrocarbon) from the polymers of the cross-linked mixture of substances by a corresponding increase in volume, in particular by the filling substance's chemical reactions associated with expansion so that ultimately the entire volume remains nearly unchanged. A sufficiently large ratio between surface and volume of the chemically reactive filling substance is essential for this, on account of which the grain size used lies in the range of 1 to 10 µm. In this connection additional chemically reactive filling substances such as, for example, boron or silicon, and moreover even chemically inert filling substances such as, for example, silicon carbide aluminum oxide or boron nitride can be used for the optimization of the process.

For the production of the final form of the bearing component, step S5 is followed by step S6, in which a fine processing of the ceramic body is done so that in a step S7 the final product appears. The fine processing can, for example, be a grinding and/or honing process in which the dimensions of the bearing component are brought to the desired final values and/or the desired surface topography is produced, in particular in the area of rolling or sliding faces.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A process for the production of ceramic bearing components comprising:
   mixing a metallo-organic preceramic precursor compound and an iron-silicon intermetallic compound; and
   subjecting the mixture to a pyrolysis reaction.

2. The process of claim 1 wherein the preceramic precursor compound is an organic silicon-compound.

3. The process of claim 2 wherein the preceramic precursor compound is a polysiloxane or a silicone.

4. The process of claim 3 wherein the preceramic precursor compound is a polysilsesquioxane or a silicone resin.

5. The process of claim 1 wherein the iron-silicon intermetallic compound is an iron silicide.

6. The process of claim 1 wherein the iron-silicon intermetallic compound is a powder having a grain size of from about 1 to 100 µm.

7. The process of claim 6 wherein the iron-silicon intermetallic compound is a powder having a grain size of from about 1 to 50 µm.

8. The process of claim 1 wherein the mixture contains at least one additional chemically reactive filling substance.

9. The process of claim 1 wherein the pyrolysis reaction is carried out in a chemically reactive gas atmosphere.

10. The process of claim 9 wherein the chemically reactive gas atmosphere is a nitrogen atmosphere.

11. The process of claim 1 wherein the pyrolysis reaction is carried out at a temperature between 1000° C. and 1700° C.

12. The process of claim 11 wherein the pyrolysis reaction is carried out at a temperature preferably between 1200° C. and 1500° C.

13. The process of claim 1 wherein the pyrolysis reaction includes at least one heat-treatment in the range of 400° C. to 1000° C.

14. The process of claim 13 wherein said heat-treatment is carried out with a holding time of from about 30 minutes to about 10 hours.

15. The process of claim 14 wherein said heat-treatment is carried out with a holding time of from about 1 to about 5 hours.

16. The process of claim 1 wherein said mixture is formed into the shape of the bearing component and the formed mixture is stabilized before the pyrolysis reaction.

17. The process of claim 16 wherein said stabilization includes hardening of the metallo-organic compound carried out at a temperature of about 100° C. to 300° C.

18. The process of claim 17 wherein the hardening is completed by radiation.

19. The process of claim 17 wherein the hardening is carried out under pressure.

20. The process of claim 16 wherein the formed mixture is further worked by mechanical processing before the pyrolysis reaction.

21. The process of claim 1 wherein the components of the mixture are coordinated with one another to control the volumetric change of the mixture during the pyrolysis reaction.

22. The process of claim 1 wherein after the pyrolysis reaction, mechanical processing of the bearing components is performed.

23. The process of claim 1, wherein the iron-silicon intermetallic compound is iron disilicide.

24. A process for the production of ceramic bearing components, comprising:

mixing a metallo-organic preceramic precursor compound and a chemically reactive filling substance; and subjecting the mixture to a pyrolysis reaction which is carried out under excess pressure;

wherein the excess pressure is from about 1 to 50 MPa.

25. The process of claim 24 wherein the excess pressure is from about 1 to 5 MPa.

* * * * *

UNITED STATES PATENT AND TRADEMARK OFFICE
CERTIFICATE OF CORRECTION

| | |
|---|---|
| PATENT NO. | : 7,144,545 B2 |
| APPLICATION NO. | : 10/290320 |
| DATED | : December 5, 2006 |
| INVENTOR(S) | : Jurgen Gegner |

Page 1 of 1

It is certified that error appears in the above-identified patent and that said Letters Patent is hereby corrected as shown below:

On Title Page Item (73)

Assignee:　　AB SKF, ~~Gothenburg~~ (SE)

should read,

Assignee:　　AB SKF, <u>Göteborg</u> (SE)

Signed and Sealed this

Twenty-seventh Day of February, 2007

JON W. DUDAS
*Director of the United States Patent and Trademark Office*